(12) United States Patent
Crafts et al.

(10) Patent No.: US 10,339,584 B2
(45) Date of Patent: *Jul. 2, 2019

(54) AUTOMATED RANKING OF ONLINE SERVICE OR PRODUCT PROVIDERS

(71) Applicant: MAVENLINK, LLC, Irvine, CA (US)

(72) Inventors: Sean Crafts, Irvine, CA (US); Roger Neel, Irvine, CA (US); Raymond Grainger, Irvine, CA (US)

(73) Assignee: MAENLINK, INC., Irvine, CA (US)

(*) Notice: Subject to any disclaimer, the term of this patent is extended or adjusted under 35 U.S.C. 154(b) by 1196 days.

This patent is subject to a terminal disclaimer.

(21) Appl. No.: 13/901,928

(22) Filed: May 24, 2013

(65) Prior Publication Data

US 2013/0268411 A1 Oct. 10, 2013

Related U.S. Application Data

(63) Continuation of application No. 12/915,697, filed on Oct. 29, 2010, now Pat. No. 8,478,651.

(60) Provisional application No. 61/256,865, filed on Oct. 30, 2009.

(51) Int. Cl.
   *G06Q 30/06* (2012.01)
   *G06Q 30/00* (2012.01)

(52) U.S. Cl.
   CPC ......... *G06Q 30/0625* (2013.01); *G06Q 30/00* (2013.01)

(58) Field of Classification Search
   CPC ............... G06Q 30/00; G06Q 30/0625; G06Q 30/0601–30/0645; G06Q 30/08

USPC .............................................. 705/26.1–27.2
See application file for complete search history.

(56) References Cited

U.S. PATENT DOCUMENTS

| 7,401,025 | B1 | 7/2008 | Lokitz |
| 8,010,619 | B1 | 8/2011 | Lawler et al. |
| 8,086,605 | B2 * | 12/2011 | Xu ...................... G06F 16/9535 707/732 |
| 2002/0059201 | A1 * | 5/2002 | Work ...................... G06Q 10/10 |

(Continued)

OTHER PUBLICATIONS

Yub.com Launches—Network Merges Social Networking and E-Commerce, Business Wire [New York] Feb. 16, 2005, downloaded from ProQuest on the Internet on Sep. 14, 2018, 2 pages. (Year: 2005).*

(Continued)

*Primary Examiner* — Jason B Dunham
*Assistant Examiner* — Brittany E Bargeon
(74) *Attorney, Agent, or Firm* — Schwabe Williamson & Wyatt, PC

(57) ABSTRACT

An online computer system is configured to receive requests from seekers for products or services and to provide the seekers and products a place to complete work once connected. The computer system searches through personal contacts of the seekers for trusted providers of the product or service request based on their proximity to the seekers. The computer system is configured to search through contacts within referral networks of the personal contacts for level-1 and level-2 providers of the product or service request. The level-2 providers might be more reliable because they are referred through the personal contacts of the seekers. The providers and referral contacts of the referrals can be rated and then provider candidates ranked according to the associated provider and referral ratings.

15 Claims, 5 Drawing Sheets

(56) References Cited

U.S. PATENT DOCUMENTS

| | | | |
|---|---|---|---|
| 2003/0177277 A1* | 9/2003 | Dascalu | G06Q 30/02 719/313 |
| 2005/0119957 A1* | 6/2005 | Faber | G06F 17/30864 705/35 |
| 2007/0192130 A1* | 8/2007 | Sandhu | G06Q 10/1053 705/321 |
| 2010/0191811 A1* | 7/2010 | Yang | G06Q 50/01 709/206 |

OTHER PUBLICATIONS

Anonymous, Yub.com Launches—Network Merges Social Networking and E-Commerce, Feb. 16, 2005, Business Wire [New York], pp. 1-2. (Year: 2005).*

Yub.com Launches—Network Merges Social Networking and E-Commerce, Business Wire [New York] Feb. 16, 2005, downloaded from ProQuestDirect on the internet on Feb. 19, 2013, 2 pages.

* cited by examiner

FIG. 5

| SEEKER: JOHN SMITH | |
|---|---|
| PROVIDER #1 BILL JOHNSON (BJOHNSON@GMAIL.COM) — 280<br>SPECIALITY: ACCOUNTING<br>SUB-SPECIALITY: RECEIVABLES<br><br>[REQUEST CHAT]  ☆ ☆ ☆ ☆<br>                           160<br>[RESUME] | NETWORK REFERRAL:<br>PROVIDER 1 IS 1 LAYER AWAY FROM YOU ON PERSONAL NETWORK 112A |
| PROVIDER #3 STEVE SIGERSON (SIGERSON@JONESMITH.COM) — 280<br>SPECIALITY: FINANCE<br>SUB-SPECIALITY: ACCOUNTING<br><br>[REQUEST CHAT]  ☆ ☆ ☆ ☆<br>                           160<br>[RESUME]  [INTRODUCTION] | NETWORK REFERRAL:<br>PROVIDER 2 IS 2 LAYERS AWAY FROM YOU ON PERSONAL NETWORK 112A, THROUGH REFERRAL NETWORK 120A OF SUE JONES 282 (SJONES@NETRENDS.COM) |
| | PROVIDER 2 IS 2 LAYERS AWAY FROM YOU ON SOCIAL NETWORK 250A, THROUGH VINCENT VEGA (VEGA@GMAIL.COM)  282 |
| PROVIDER #2 DONALD JORDAN (DJOR@WEBVIEWS.COM) — 280<br>SPECIALITY: ACCOUNTING<br>SUB-SPECIALITY: AUDITING<br><br>[REQUEST CHAT]  ☆ ☆<br>                   160 | NETWORK REFERRAL:<br>PROVIDER 3 IS 1 LAYER AWAY FROM YOU ON SOCIAL NETWORK 250B |

AUTOMATED RANKING OF ONLINE SERVICE OR PRODUCT PROVIDERS

The present application claims priority to U.S. patent application Ser. No. 12/915,697; filed Oct. 29, 2010 that claims priority to provisional Application Ser. No. 61/256, 865 which are both herein incorporated by reference in their entirety.

BACKGROUND

Businesses or individuals seeking services, advice, and products ("seekers") frequently ask friends, colleagues or acquaintances to recommend or validate candidates for the services, advice, and/or products ("providers"). The goal of seekers in making the inquiries is to increase the chances of choosing a quality provider and minimize the corresponding risks associated with making a poor selection. The seeker can obtain direct information from the providers based on in-person meetings and proposals. The seeker can also use several traditional channels to reach friends, colleagues or acquaintances, including in-person meetings, phone calls, entails, and instant messaging.

As the needs of seekers become more and more specific, there is a growing demand for specialized services from providers to be provided on an as needed basis. Further, as more and more services are extended through an online environment, seekers have a wider group of potential providers from which to choose. This has several advantages such as removing geographic limitations, increased competition for price and quality, breadth of available services, and more mediums of interaction between seekers and providers. However, trying to find increasingly niche skill sets within this expansive group of providers from across the globe makes it less likely that traditional channels will be able to provide reliable recommendations. Specifically, it may be more difficult for the seekers to locate acquaintances who can vouch for the providers.

Current online service and product delivery systems have used a variety of tools and capabilities to address the challenge of selecting a provider, including community ranking of the provider, individual feedback ratings for a provider, money back guarantees, online tests taken by providers, and provider self-examination. However, these tools still lack the level of confidence provided by personal referrals.

BRIEF DESCRIPTION OF THE DRAWINGS

FIG. 5 is a block diagram showing how providers are presented to a seeker.

DETAILED DESCRIPTION

Figure 1:
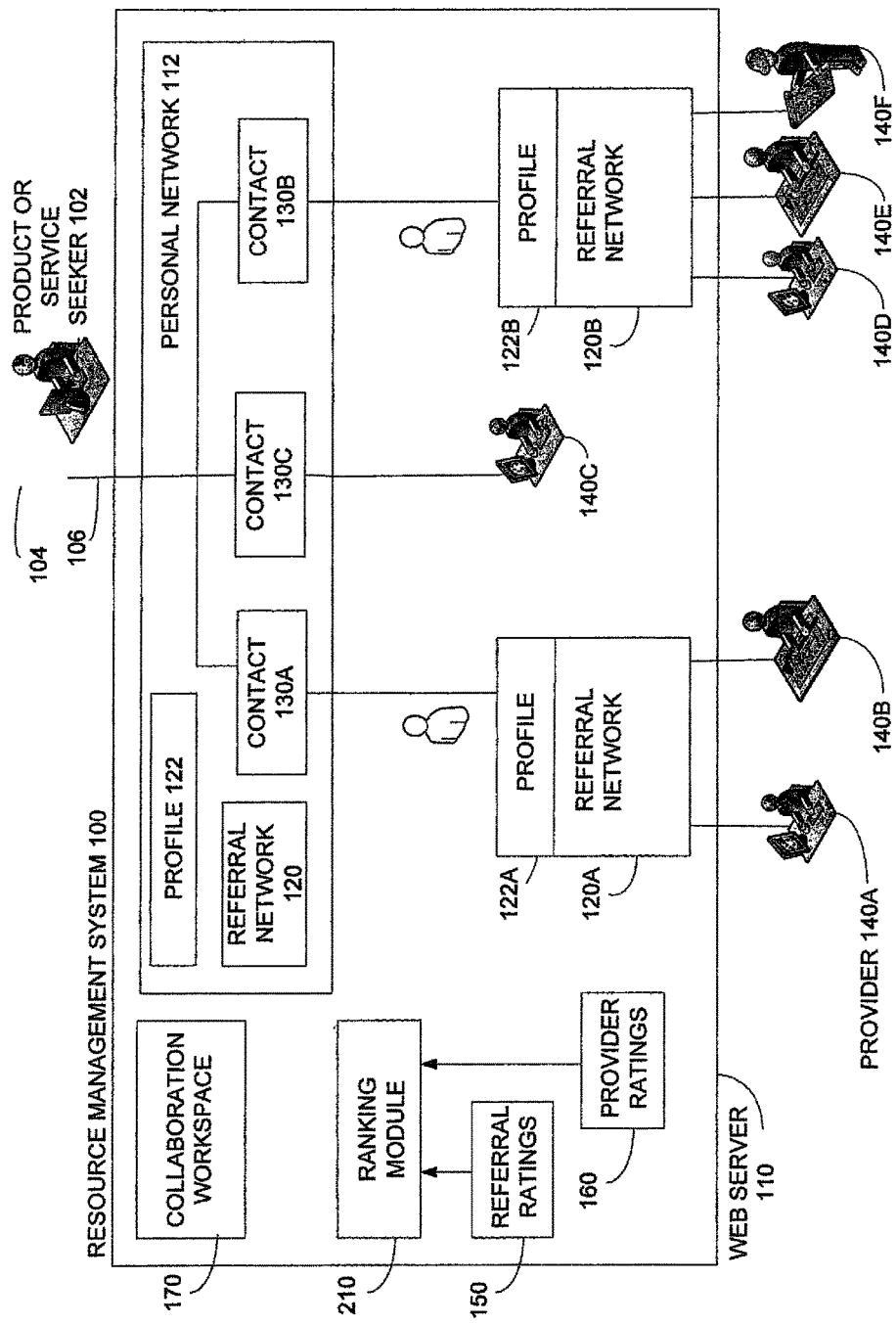
FIG. 1 is a block diagram of a resource management system.

Referring to FIG. 1, current online services and product delivery systems used for locating providers and products lack the element of trusted recommendations or referrals from friends, colleagues or acquaintances. Something the seeker would most certainly explore in a non-virtual selection process. A resource management system 100 provides online seekers with trusted recommendations within an online context, reducing the risks associated with using online services and products and facilitating the process of finding a trusted resource.

The resource management system 100 uses both personal contacts and referral contacts to identify and rank different providers 140 of products and services. In one embodiment, the resource management system 100 operates on a network web server 110 connected to a computer 104 of a user seeking products or services. Any combination of the computer 104, software operating on the computer 104, and/or the user of the computer 104 are referred to generally as a seeker 102. Only one seeker 102 is shown in FIG. 1 however it should be understood that any number of seekers 102 may access system 100. Any references below to a single seeker may also apply to a plurality of seekers and vice versa. Further, any references below to a single provider 140 may also apply to a plurality of providers 140 and vice versa.

The seeker 102 may be connected to the management system 100 via any combination of wireless or wire line connections 106. For example, the computer 104 may be a smart phone that runs an application that establishes a wireless phone or wi-fi connection 106 that communicates over the Internet with the resource management system 100. In another embodiment, the computer 104 is a Personal Computer (PC) that uses a web browser to connect over an Internet connection 106 with the web server 110 that operates resource management system 100.

The blocks shown in resource management system 100 represent different combinations of data and functions that may be implemented by processors and memory within one or more web servers 110 and storage servers. Some of the operations described below may be performed on the computer 104 and other operations performed on the web server 110. Of course other types of computing devices can also be used to implement seeker 102 and resource management system 100, such as tablet PC's, smart phones, and any other wireless or wired computing device.

A personal network 112 represents a set of contacts 130 created or linked to by seeker 102. For example, contacts 130A-130C may include a name, address, phone number, email address, professional specialty and sub-specialties, a ranking of their particular provider services, a ranking of their referral services, etc. While shown located in the personal network 112 of seeker 102, the contacts 130 referenced in personal network 112 may be an array of pointers that point to locations in a database where the contact information is located. For example, a contact 130 can be created in personal network 112 when the seeker 102 accepts an invitation from another user to join their network, when the seeker 102 manually enters the name, address, specialty, etc. of the contact into system 100, or when a contact 130 works on a project with seeker 102.

The seeker 102 and contacts 130 can establish associated referral networks 120 that can include some or all of the same contacts 130 in their associated personal networks 112. For example, the seeker 102 can designate any of contacts 130A-130C as part of referral network 120 by selecting fields within profile 122 that designate that particular contact 130 as a referral. Other information within profile 122 is discussed in more detail below.

The contacts 130 can operate as providers of goods and services, a referral source for other providers of goods and services, both, or neither. In the example shown in FIG. 1, contacts 130A and 130B may be providers of products or services but also serve as referral sources for other providers 140A-140B and 140D-140F, respectively. The user associated with contact 130A creates their own referral network 120A by configuring profile 122A to designate contacts 140A and 140B as referrals. The user associated with contact 130B creates a referral network 120B by configuring profile 122B to designate contacts 140D-140F as referrals.

The contacts 140A-140F are also potential providers of products or services to seeker 102 and are therefore alternatively referred to below as providers 140A-140F. The contact information contained in the profiles 122 for the providers 140A-140F may be the same as any other contact 130 and identifies the name, address, email address, and any particular specialties of the person associated with provider 140. The profiles 122 for the providers 140 can also include a ranking of their particular provider services and or a ranking of their referral services.

Contact 130C did not designate any of their personal contacts as referrals and therefore does not have a referral network 120 and does not operate as a referral source for seekers 120 or providers 140. However, contact 130C operates as a provider of goods and services and is therefore alternatively referred to below as a provider 140C in appropriate seeker requests. Provider 140C is considered a level-1 since contact 130C is part of the personal network 112 of seeker 102. Providers 140A-140B and 140D-140F are level-2 providers since they are only indirectly connected to seeker 102 through contacts 130A and 130B, respectively.

An on-line collaboration workspace 170 located on the web server is used by the seeker 102, any selected providers 140, and potentially any associated referral sources for the providers 140, if any and depending on the preference of the parties established in the network profile 122 as described below. For example, seeker 102 may select and use the provider 140D for accounting services. The seeker 102 and provider 140D can create a workspace 170 in resource management system 100 for the accounting project. The seeker and provider 140D create and enter into a service contract via documents exchanged within workspace 170. Tax documents, invoices, and payments can then be loaded and exchanged between seeker 102 and provider 140D via the workspace 170.

In the example in FIG. 1, the contact 130B served as the referral source of provider 140D to seeker 102. Contact 130B by configuring profile 122B has the option of participating in the accounting project as either an active network director or a passive network director. For example, the contact 130B when configured through profile 122B as an active network director can introduce provider 140D to seeker 102 and can participant in the project created in workspace 170. The contact 130B when configured through profile 122B as a passive network director is not to be notified of any correspondence or projects established between seeker 102 and providers 140D-140F. Active and passive network directors are described in more detail below.

Identifying Providers

On-line ratings systems usually rate service providers, restaurants, product providers, etc. on a star scale. For example, five stars is the best rating and 1 star is the worst rating. Because the seeker may not know any of the people rating a particular provider, the trustworthiness of the star ratings is questionable. For example, some rankings may be from persons employed by the provider or from persons that have a biased personal relationship with the provider. Further, dozens of providers may have similar star ratings, leaving the seeker with no clear indication of what provider to select.

Personal referrals from friends, work associates, and family members are usually considered more trustworthy than referrals from current online systems. A person can also weigh the recommendations from acquaintances based on their personal knowledge and experiences with the acquaintance. For example, a seeker may admire the remodeling work performed on the house of a friend. Since the friend has shown prior aptitude for choosing high quality remodeling contractors, that friend may be a more trustworthy referral than an on-line contractor referral service.

The resource management system 100 identifies providers 140C that are personal contacts within the personal network 112 of the seeker 102. The system 100 also identifies providers 140A-14B and 140D-140F that referred through the personal contacts 130A and 130B within the personal network 112 of seeker 102. These providers 140 may be given more deference when ranked against other providers without a personal contact connection with the seeker 102. Thus, personal contacts 130 of the seeker 102 are used to automatically identify and help differentiate product and service providers 140.

The resource management system 100 includes a ranking module 210 that ranks the identified providers 140 according to both a provider ranking 160 and a referral ranking 150. For example, provider 140B is identified as a referral from contact 130A. Contact 130A is a personal contact located within the personal network of seeker 102. With all else equal, the ranking module 210 may rank provider 140B higher than other providers 140 that are not personal contacts 130, and are not referrals from personal contacts 130, of seeker 102.

Contacts 130A and 130B provide referrals through referral networks 120A and 120B, respectively, and may also be ranked in referral ratings 150. The referral ratings 150 provide an indication of the general quality of the referrals provided by a particular contact 130A or 130B. If the referral rating of a contact 130A or 130B is low, the final ranking of a provider 140 identified through that contact may be lowered. On the other hand, if the referral rating 150 of the contact 130A or 130B is high, the final ranking of the provider 140 identified through that contact may be higher.

Figure 2:
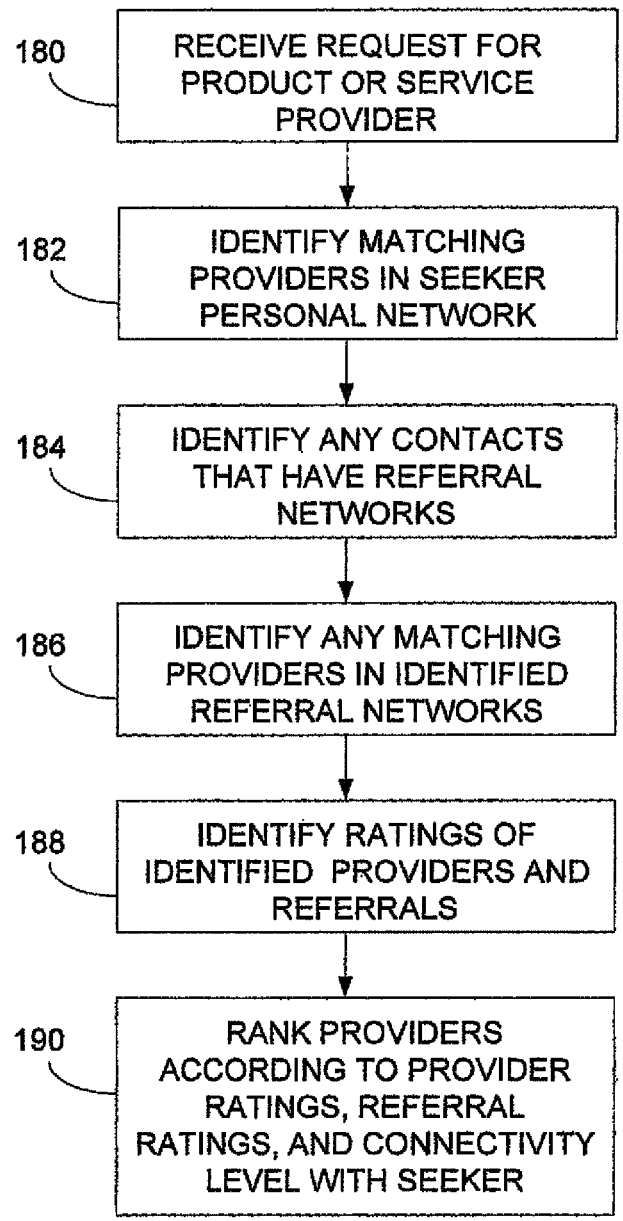
FIG. 2 is a flow diagram showing how the resource management system of FIG. 1 identifies providers.

FIG. 2 shows in more detail how the resource management system 100 of FIG. 1 operates. In operation 180 the resource management system 100 receives a request from a seeker 102 for a particular service or product provider. For example, the seeker 102 may request a divorce lawyer. In operation 182 the management system 100 looks through the personal network 112 of seeker 102 for any direct contacts that may have an associated specialty field corresponding with the request. For example, personal contacts 130 are identified within the personal network 112 of seeker 102 that have a specialty profile identifier for divorce law.

In operation 184 the management system 100 identifies any contacts 130 in personal network 112 that have referral networks 120. In the example of FIG. 1, personal contacts 130A and 130B have referral networks 120A and 120B, respectively. The management system 100 in operation 186 identifies any contacts in the referral networks 120A and 120B that correspond to the seeker request. For example, the management system 100 identifies contacts within the referral networks 120A and 120E having profiles with a specialty listed as divorce law, domestic relations law, or divorce attorney. The management system 100 may also access other networks for providers, such as an on-line lawyer referral service.

In operation 188 the resource management system 100 determines the provider ratings 160 of the identified providers 140 and the referral ratings 150 of any associated referral sources. For example, the provider 140B in FIG. 1 may have been previously rated on five different projects. An overall rating may be derived by averaging the five different ratings. The overall provider rating might also factor in the total number of projects completed by the provider. Two of the five projects may have stemmed through a referral from contact 130A. The referral rating 150 for contact 130A may be i) the average of the two provider ratings 160 for the two projects where contact 130A served as a referral or the average for all of the provider ratings 160 for all of the providers 140A and 140B within the referral network 120A of contact 130A, or iii) a blend of i) and ii). Alternatively, the seekers 102 may manually assign referral ratings 150 to contact 130A for the two projects.

In operation 190 the resource management system 100 ranks the candidate providers 140 according to the provider ratings 160, any associated referral ratings 150, and/or the connection level between the seeker 102 and the candidate provider 140. For example, with all else equal, a provider 140 with a higher provider rating 160 may be ranked higher than a provider 140 with a lower provider rating 160.

With all else equal, a provider 140 with a higher associated referral rating 150 may be ranked higher than a provider 140 with a lower associated referral rating 150 or with no referral rating. For example, contact 130A may have a relatively low referral rating. Since provider 140B was located through the referral network 120A of contact 130A, provider 140B may be given a lower ranking. The provider 140B may be given a higher ranking if contact 130A has a relatively high referral rating 150. Alternatively, the referral ratings 150 of a referral source for a provider 140 may be presented separately to the seeker 102 and the providers 140 ranked only according to their provider rating 160.

In another example, candidate providers 140 may be identified that are not located in the personal network 112 of the seeker 102 and are not located through the referral network 120 of a personal contact 130. For example, a provider 140 may be identified through a social network of the seeker 112 or through a lawyer referral service. With all else equal, this provider 140 may be ranked lower than another provider 140 that has an associated referral rating 150 through system 100 that is above some threshold.

The candidate providers 140 can also be ranked according to their contact level with the seeker 102. For example, provider 140C is also a personal contact 130C within the personal network 112 of seeker 102. Therefore provider 140C has one degree of separation from seeker 102 and is considered a level-1 provider. The provider 140B is connected to seeker 102 through the referral network 120A of contact 130A. Therefore, provider 140B has two degrees of separation from seeker 112 and is considered a level-2 provider. In one embodiment, with all else equal, the level-1 provider 140C may be ranked higher than the level-2 provider 140B. On the other hand, if referral contact 130A has a particularly high referral rating 150, the level-2 provider 140B may be ranked higher than the level-1 provider 140C. Providers 140 with additional degrees of separation from seeker 102 may be ranked even lower.

Other parameters can also be considered when ranking the providers 140. The providers 140 with specialties that more closely match the product or service request may be ranked higher. For example, a graphics artist may identify a sub-specialty in a particular programming language. If the request from seeker 102 includes that particular programming language, then that provider 140 with the programming language sub-specialty may be ranked higher than other providers that do not have that particular specialty.

The reliability of the overall provider rating 160 may improve with a larger number of projects and associated provider ratings 160. Therefore, with all else equal, a provider 140 with a larger number of provider ratings 160 may be ranked higher than a provider 140 with a to same average overall provider rating 160 but with a lower number of provider ratings. The ranking of a provider 140 may also be increased when the provider ratings 160 for other participants in the projects are on an average higher than other providers 140.

If two providers have the same overall ranking, the provider 140 with the closer connection level with the seeker 102 may be ranked higher. In another example, if two providers have the same overall ranking, the provider 140 with the higher associated referral ranking 150 may be ranked higher. Any of the ranking parameters identified above may be configured to have priority over other ranking parameters. In other embodiments, the different ranking parameters may be weighted differently to determine final candidate provider rankings.

The candidate providers 140 are displayed to the seeker 102 in order of their ranking. The seeker 102 can then select any of the candidate providers 140 in the ranked candidate list. For example, the seeker 102 may contact divorce attorney 140B and ask for a proposal for fees. If the proposal is accepted, the seeker and provider 140B create a workspace 170 (FIG. 1) for conducting the project. The seeker 102 and provider 140B can draft and sign an engagement agreement and exchange documents through the workspace 170. After the project is completed, in this case when the divorce proceedings have ended, the seeker 102 can rate both the provider 140B and potentially the contact 130A that acted as the referral source for provider 140B. In other embodiments, the referral source rating 150 might be derived indirectly from the seeker's 102 rating of the provider 140B. The additional provider ratings 160 and referral ratings 150 are then used by the ranking module 210 in subsequent candidate provider rankings.

Figure 3:
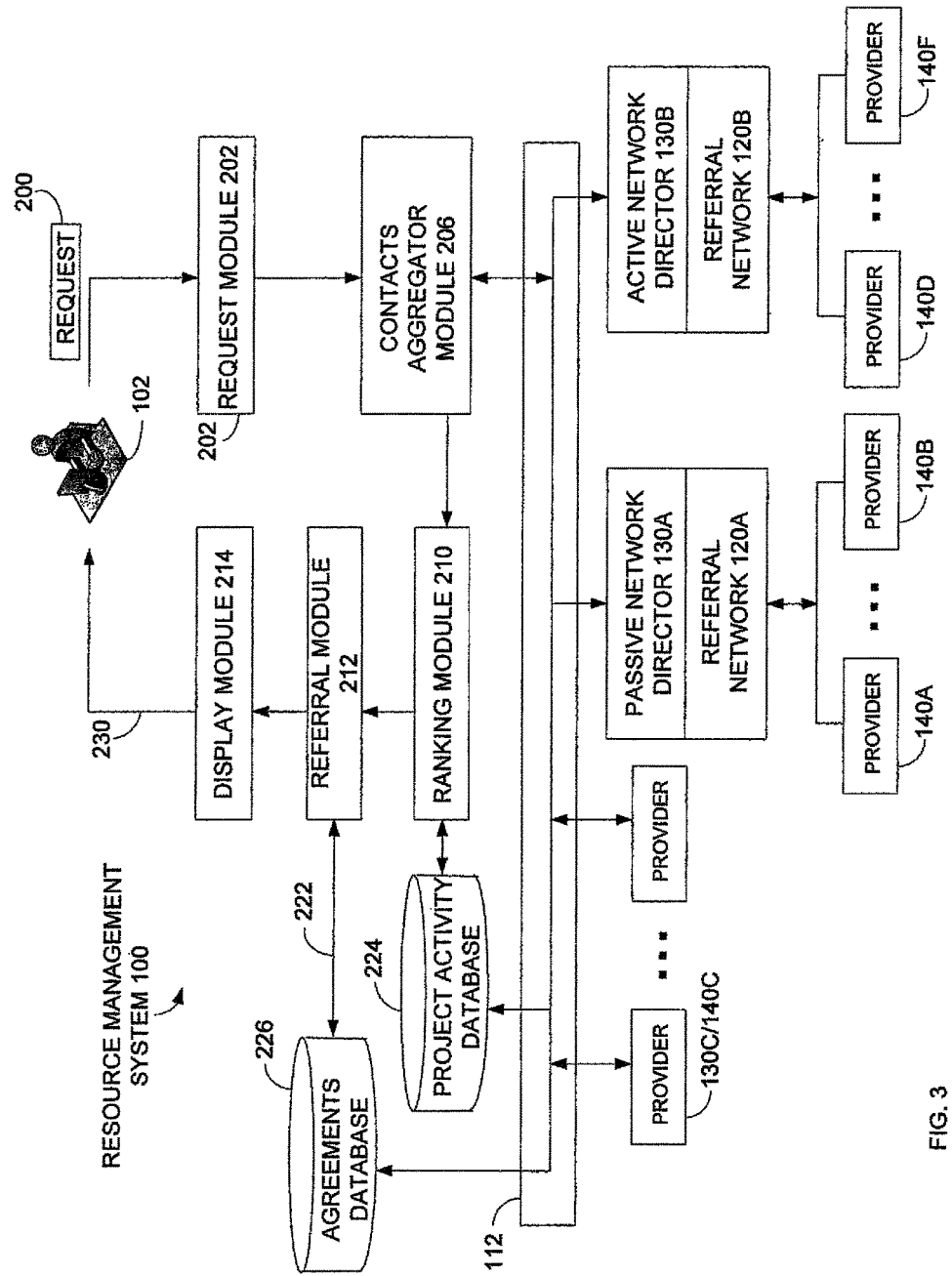
FIG. 3 is a block diagram showing the resource management system of FIG. 1 in more detail.

FIG. 3 shows the resource management system 100 in more detail. A request module 202 receives requests 200 from seekers 102. The seekers 102 can be individual contacts, contact organizations, service providers, or any other entity that requires a product or service provider 140. The request module 202 identifies certain information in the request 200 such as what product or service is sought and the identity of the seeker 102. As explained above, when contacts are entered into a personal network 112 or referral network 120, the resource management system 100 may present a specialty field to the person affiliated with that particular contact. The management system 100 presents a similar specialty field to the seeker 102 when formulating a request 200 for a particular product or service.

The identity of seeker 102 can be an email address, name, login name, password, phone number, etc. that uniquely identifies the seeker 102 and links the seeker 102 to a particular personal network 112 and other data in databases 224 and 226. The request module 202 uses the identity of seeker 102 to create, identify, and manage associated agreements with other seekers 102, contacts 130, and providers 140. The request module 202 passes the product or service and seeker identified in the request 200 to a contacts aggregator module 206.

The contacts aggregator module 206 identifies any contacts 130 in the personal network 112 that have the particular specialties identified in request 200. These contacts 130 are alternatively referred to as direct contacts, direct connections, direct providers, or level-1 providers. For example, contact 130C is also a level-1 provider 140C for seeker 120.

The contacts aggregator module 206 also identifies the referral networks 120A and 120B for contacts 130A and 130B, respectively. The contacts aggregator module 206 also searches through referral networks 120A and 120B for providers 140 that have the particular specialties identified in the request 200. The providers 140A, 140B, and 140D-140F are alternatively referred to as indirect providers, level-2 connections or level-2 providers to seeker 102.

The contacts aggregator module 206 aggregates all the provider candidates 140 for request 200. In other words, contacts aggregator module 206 identifies all of the level-1 to providers 140C and level-2 providers 140A, 140B, and 140D-140F that have the particular specialties identified in request 200. The aggregator module 206 then passes all of the possible provider candidates 140 to the ranking module 210. Additional provider levels can also be identified.

The ranking module 210 receives the provider candidates 140 and any other associated information from aggregator module 206. Ranking module 210 searches a project activity database 224 for any provider ratings 160 and referral ratings 150 for the candidate providers 140 and any associated referral sources, respectively.

Provider candidates 140 are ranked based on any combination of different parameters. As mentioned above, the rankings may be based on how closely the specialties of the candidate providers 140 match the product or service sought by the seeker 102. In another example, a first candidate 140A may identify themselves as a divorce attorney. A second contact 140B may identify themselves as a divorce attorney with a sub-specialty in child custody. If the request 200 requests services for a divorce attorney in a child custody matter, candidate 140B may be given a higher ranking than candidate 140A.

The specialty and sub-specialty information is entered into fields that are presented to a user when entering biographical information into the resource management system 100. The user may also submit a resume along with their other contact information. The resource management system 100 can then parse through the resume of potential providers for additional biographical information and relatedness of such biographical information to the specialty and sub-specialty information associated with the request 200.

As also mentioned above, the ranking module 210 may rank the provider candidates 140 according to their proximity to the seeker 102. For example, with all else equal, a level-1 provider 140C may be ranked higher than level-2 providers 140A, 140B, or 140D-140F. The level-1 and level-2 association of a particular provider 140 with a particular seeker 102 is identified by the contacts aggregator module 206 and supplied to the ranking module 210.

The resource management system 100 tracks the total number of projects associated with a particular provider 140 or referral source in project activity database 224. A lead seeker 102 or lead contact 130 may be associated with each project and sub-seekers or sub-contacts may also be identified for a particular project. A lead provider 140 or main contactor may be identified for the project and sub-providers or sub-contractors also identified for the project and stored in project activity database 224.

A referral module 212 controls what and how candidate providers 140 are presented to the seeker 102. For example, a first candidate provider 140C is located in the personal network 112 of seeker 102. The referral module 212 may display this level-1 provider 140C to the seeker 102 without further restrictions.

Network Directors

As mentioned above, the contacts 130A and 130B can be configured as active network directors or passive network directors. In the example in FIG. 3, contact 130A is configured as a passive network director and contact 130B is configured as an active network director. A passive network director refers to a contact 130A that does not want to be directly involved for projects established through their referral network 120A. A passive network director 130A might or might not want a referral fee for projects established through their referral network 120A. For example, contact 130A may be a lawyer that has contacts for other legal specialties. Contact 130A would like to receive referrals back from these other legal contacts but does not want any fees for providing referrals.

The referral module 212 identifies a candidate provider 140A that was identified through the referral network 120A of contact 130A. The referral module 212 reviews profile 122A in FIG. 1 and determines contact 130A is a passive network director. Accordingly, the referral module 212 presents the candidate provider 140A to seeker 102 without notifying contact 130A. However, the referral module 212 may notify contact 130A of any subsequent provider rating 160 given to provider 140A by seeker 102. The contact 130A may also configure profile 122A so that contacts aggregator module 206 does not use any personal contacts as referrals unless they are contained in referral network 120A. If the provider rating 160 is unsatisfactory, the contact 130A may then choose to remove provider 140A from referral network 120A.

In this example, contact 130B has been configured through profile 122B in FIG. 1 to operate as an active network director. For example, the contact 130E may be associated with an employment service that manages the providers 140D-140F. For active network directors, the referral module 212 presents candidate providers 140 through their referring contact. For example, provider 140D may be identified as a candidate provider. The referral module 212 may initially hide provider 140D from seeker 102 or provide information about provider 140D under an anonymous heading. The referral module 212 instead presents the referring contact 130B (active network director) in the list of candidate providers to seeker 102. The seeker 102 then communicates directly with active network director 130E who can then determine when to introduce provider 140D. All subsequent communications for the project between seeker 102 and provider 140D can also be directed to or through the active network director 130B in the collaboration workspace 170.

The referral module 212 identifies other relationships between any of the candidate providers 140 and associated referral sources. For example, contacts aggregator module 206 may have identified a candidate provider 140 through an external social network of passive network director 130A that is not in referral network 120A. The passive network director 130A may configure profile 122A in FIG. 1 so that the referral module 212 filters these unintended referrals identified in the external social network of passive network director 130A from seeker 102.

Alternatively, a provider 140 found through a social network, or anywhere outside of a referral network 120, may first be presented to the active network director 130B. The active network director 130B providing the link to the candidate provider 140 can then either allow or not allow the candidate provider 140 to be presented to the seeker 102. By clicking on a displayed field the active network director 130B may cause the referral module 212 to send a referral agreement to the candidate provider 140 requiring a 10% referral fee. After the candidate provider 140 signs and sends the referral agreement back to the active network director 130B, the candidate provider 140 is presented to the seeker 102. The active network director 130B might also click on another field displayed by the referral module 212 that automatically adds the candidate provider 140 to their referral network 120B.

In another embodiment, candidate providers 140 located outside of the referral networks 120 may be displayed to the seeker 102 but with a lower ranking or with a notice that the contact 130 that provided the link to the candidate provider 140 is not serving as a referral source.

The referral module 212 applies referral agreements in database 226 to projects. For example, contact 130B and provider 140D may have entered into a referral contract where contact 130B receives a referral fee of 10% of all billings for any projects established through referral network 120B. The referral module 212 may determine when a project is completed and then on behalf of contact 130B automatically send an invoice to provider 140B for 10% of the total fees for the project.

The agreement database 226 may also contain introduction letters that contacts 130A or 130B can write for associated providers 140. For example, the contact 130A may load an introduction letter into agreements database 226 for provider 140B. The referral module 212 attaches the introduction letter whenever provider 140B is presented as a candidate provider 140 to a seeker 102 through contact 130A.

The display module 214 receives the ranked provider candidates 140 and any associated display permissions identified by referral module 212. For example, the display module 214 may display all level-1 providers, such as provider 140C, that are identified directly from the personal network 112 of seeker 102. The display module 214 also presents candidate providers 140 identified through passive network directors, such as client 130A, directly to the seeker 102 without notifying client 130A. For provider candidates 140 from active network directors, such as client 130B, the display module 214, alternatively or in addition, presents the contact information of the active network director to the seeker 102.

Figure 4:
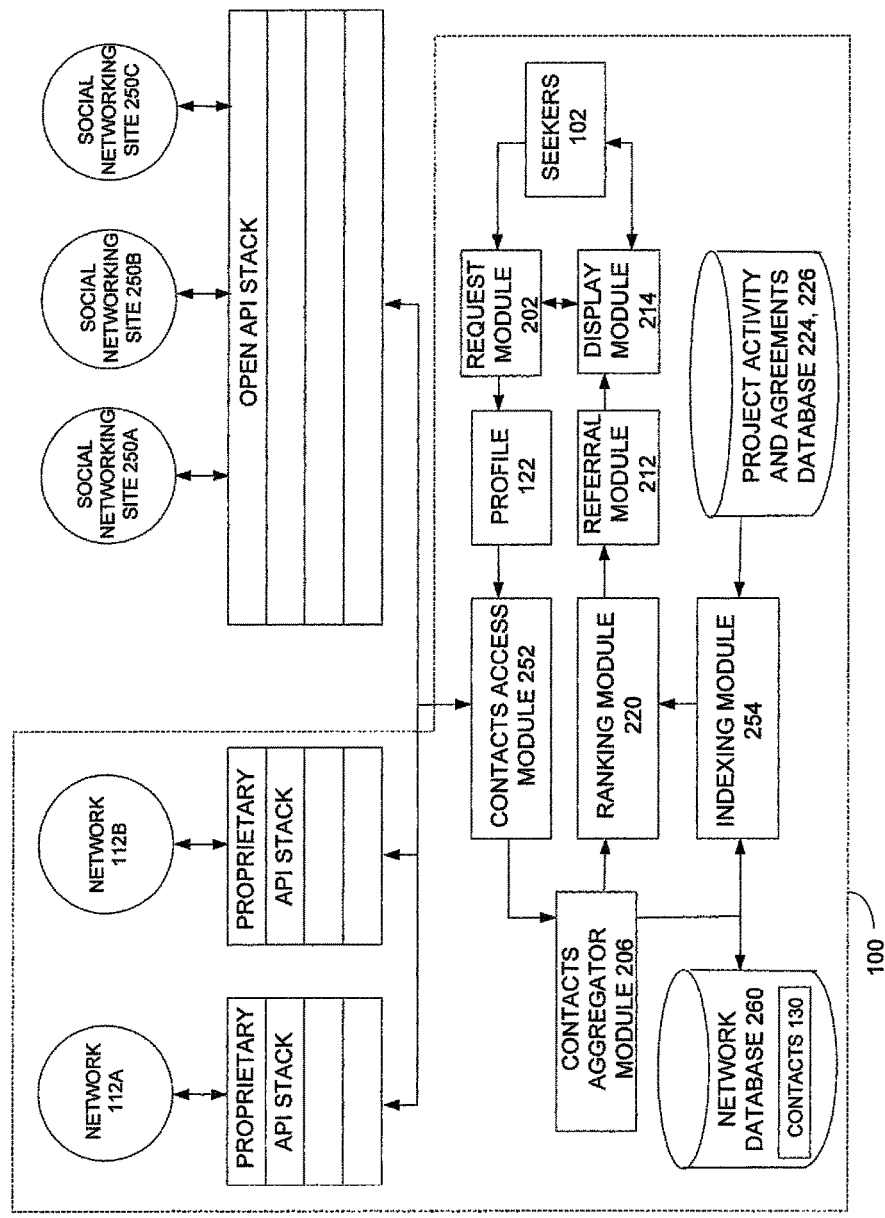
FIG. 4 is a block diagram showing an alternative embodiment of the resource management system.

FIG. 4 illustrates another embodiment of the resource management system 100 that identifies contacts from both internal networks 112 operated from within the resource management system 100 and a variety of external online social networks 250 that operate outside of the resource management system 100. The resource management system 100 accesses, aggregates, indexes and utilizes contacts of individuals and other related relationships from one or more of the internal networks 112 and external networks 250 to assist with the selection and provisioning of online services and/or products via an electronically mediated referral engine. The resource management system 100 can also identify different products within an online product sales and delivery platform. For example, the display module 214 could identify who else in the personal network 112 recently purchased similar products or services.

The internal networks 112 and external networks 250 contain contact information for friends, colleagues, or acquaintances, business associates, or any other contacts for particular individuals. The networks 112 and 250 include contact information for a multi-layered hierarchy of contacts. The resource management system 100 identifies degrees of separation and types of relationships between the contacts within the different networks 112 and 250. The contacts in the networks 112 and 250 can also be identified as business acquaintances, friends, alumni, etc. The contacts can also include other relationship information such as how long the person affiliated with the network has known particular contacts.

Internal networks 112 have proprietary and limited Application Programming Interfaces (APIs) available for accessing relationship information about the retained contacts. Networks 250 are associated with external social network sites that possess open APIs for accessing information for the contained contacts. Networks 112 and 250 may use APIs capable of being accessed by a common API framework, but are not required to have common API frameworks.

A contacts access module 252 makes programmatic calls out to the APIs of the networks 112 and 250 on behalf of seekers 102. As described above, the seekers 112 are persons who sign up and join the resource management system 100 to help identify providers 140 of different products and services. The providers 140 may or may not have signed up and joined the resource management system 100 as a class of potential providers of online services.

The contacts access module 252 uses the profile 122 for the seeker 102 as a source of input parameters for making outgoing calls to the internal networks 112 and the external social network 250. For example, the profile 122 may only include a link to the internal personal networks 112A. The seeker 102 may selectively add links in the profile 122 to other external networks 250 that can be searched for additional contacts. The profile 122 can be configured by the seeker 102, on an opt-in basis, to select one or more of the networks 112 and/or 250 for accessing by contacts access module 252.

Profile 122 is also configured by the seeker 102 to select any number of display preferences. For example, the seeker 102 may configure the resource management system 100 through profile 122 to display contact relationship information based upon positive or negative performance feedback and ratings of a provider 140 either inside or outside of the system 100. The number of contacts within the networks 112 and 250 are likely to expand over time as social networking sites continue to expand their coverage of relationships between individuals. The profile 122 allows the seeker 102 to identify which networks 112 and 250 and which contacts in those networks to use for provider recommendations. The bi-directional process of automatically searching through the networks 112 and 250 and obtaining contact information can be performed at regular intervals, or can be performed responsive to a sign-up or sign-in activity by the seekers 102 or any other automatic or manual condition.

The contacts aggregator module 206 accumulates the contacts and relationship information extracted from the networks 112 and 250 into contact records 130 and stores the contact records in a network database 260. Users can then designate via their profile 122 what contacts 130 in database 260 to include in their referral networks 120 in FIG. 1. The contacts 130 and any related information in network database 260 can be converted into a binary format that is used by the resource management system 100 to identify providers 140.

An indexing module 254 links any referral ratings 150 and provider ratings 160 entered into the project activity database 224 with the associated contacts 130 in network database 260. The indexing module 254 can also associate other scoring and meta information with the aggregated contacts 130. This can include identifying relevant activities of both seekers 102 and providers 140 within resource management system 100, the proximity of connections between seekers 102 and particular providers 140 within network database 260. For example, as mentioned above candidate providers 140 can be identified as level-1 providers or level-2 providers to a particular seeker 102. The indexing module 254 can also run automatically at regular intervals and/or on demand as new members join or sign into resource management system 100.

The request module 202 receives requests from the seekers 102. The indexing module 254 locates the candidate providers in network database 260 according to the request, the ranking module 220 ranks the candidate providers, the referral module 212 filters the candidate providers according to agreements in agreement database 226, and the display module 214 presents the candidate providers to the seeker 102.

The ranking module 220 can also rank the candidate providers 140 according to the reliability of the social networking sites 250 and the number of contacts of the seeker 102 that has selected the product or service provider 140. For example, internal network 112 may be considered more reliable than any of the external social networks 250.

The display module 214 can also provide various provider parameters to the seeker 102 to choose from. For example, the display module 214 allows the seekers 102 to choose providers 140 according to levels of proximity to the seeker 102 or according to where the providers are located in networks 112 or 250. The display module 214 allows the seeker 102 to direct the management system 100 to only identify the candidate providers 140 that are located in the personal network 112A of the seeker 102 or located in the referral networks 120 of contacts within personal network 112A.

The seeker through display module 214 may also select providers 140 according to how recent the providers 140 has been selected for a project or according to the feedback given on the provider 140. For example, the seeker 102 may direct the resource management system 100 to filter any providers 140 with an overall rating less than three stars or that have not been selected for a project in more than two months.

EXAMPLE

In one example, a user named John Smith decides to sign up to use the online resource management system 100. As part of the sign up process, John is offered the opportunity to identify any social networking sites he currently uses along with the appropriate passwords for those sites. Trusting the site, John provides inputs for social networking site 250A and social networking site 250B. These sites contain information about John including his personal and business contacts, as well as at least two additional levels of connectivity related to his personal and business contacts.

As part of the process of signing up, information is displayed by the resource management system 100 educating John on how to connect to other users within the resource management system 100. Because John was referred verbally to the site by his friend Su; John decides to search through the public profiles 122 of other users. Through the search, John finds his friend Sue and sends an electronic request to be linked with her inside the resource management system 100. Sue happens to be online, and immediately accepts John's invitation. The resource management system 100 then automatically adds Sue as a contact 130 in the personal network 112 of John and adds John as a contact in the personal network 112 of Sue. At this time John or Sue can also designate the other as part of their referral network 120.

Soon after connecting with Sue, John proceeds to start the process of using the online resource management system 100 to locate an expert in finance and accounting to provide analysis related to aging receivables. John inputs a request into the system 100 for finance and accounting services and an amount he is willing to pay for the services. The request is received by request module 202 and the display module 214 presents John with a list of possible parameters to limit or adjust the candidate providers 140 per his request. For example, the display module 214 may provide John with the option of selecting which networks 112 and 250 and what level of connectivity to use for locating providers 140.

John selects an option that causes the contacts access module 252 to use the contact information from both his internal personal network 112 and information from his external social networking sites 250A and 250B for identifying potential providers 140. John also chooses to only see level-1 and level-2 providers that are separate from John by no more than one direct contact 130. The management system 100 accesses the networks 112, 250A, and 250B for candidate providers 140.

Three candidate providers 140 are identified from the request. A first provider #1 corresponds with provider 140C in FIG. 1, is a longtime friend and has successfully helped a number of seekers 102 with their analysis of aging receivables through the management system 102. A second provider #2 is a business acquaintance of John who was captured by the contacts access module 252 from one of John's social networks 252. A third provider #3 was located through the referral network of Sue and through another acquaintance in social network 250A. The third provider #3 recently helped Sue with her small business accounting needs, and received a favorable provider ranking 160 from Sue.

Based on the information related to the providers 140 described above, the ranking module 210 returns the list of three potential providers, ranked from top to bottom in the following order provider #1, provider #3, and provider #2. These rankings are based on the implicit relationships of the providers 140 with John, the contacts between John and the referrals, contacts that have used the providers 140 within the resource management system 100, and any other feedback or ratings information as described above.

In addition to returning the candidate providers 140 to John in an automatically ranked order, the resource management system 100 can also present other information about the providers, including the networks where the providers 140 were located, the individuals who used the providers 140, and any ratings given to the providers 140 inside the resource management system 100.

FIG. 5 shows one example of how the candidate providers are presented to the seeker John Smith. The display module 214 displays the candidate providers 140 in a prioritized order according to their provider ratings 160, associated referral ratings 150, connection level with the seeker, and any other parameters as described above. The display module 214 may indicate how the seeker John Smith is connected to the candidate providers 140. For example, the first listed provider #1 was found in John's personal network 112A. Therefore, the first provider 140 is indicated as being a layer-1 contact with John in network 112A.

The second listed candidate provider #3 is connected to John through referrals from Sue and Vincent. As explained above, provider #3 was identified through the referral network 120A of Sue. Therefore, the candidate provider #3 is shown as a layer-2 connection with John. The candidate provider #3 is also identified in the social network 250A of John through Vincent. Therefore, the display module 214 indicates that provider #3 is a level-2 connection with John in network 250A through Vincent. The provider #2 is identified as one of John's direct contacts in the social network 250B. Therefore, the provider #2 is shown identified as a level-1 connection with John in social network 250B.

The display module 214 can display provider ratings 160 for the different providers 140. The display module 214 may also provide links 280 to the candidate providers 140 and provide links 282 to any references so that the John can conduct live project and candidate interviews. Any resumes of the providers may be displayed and any letters of introduction from a reference may also be displayed. The display module 214 may present the candidates 140 in a collaborative workspace 170 with private discussions allowed between the seeker 102 and the candidates 140.

The display module 214 may present availability of the candidates 140 based on an understanding of time allocated for work in the management system 100 and the total time currently estimated on committed work in the management system. For example, a particular provider candidate 140 may currently be working on a project through a collaboration workspace 170 in system 100. The project may identify the provider candidate as scheduled or budgeted to work for 20 hours over the next week. The seeker 102 proposing the new project may indicate the project completion date as two weeks from the current day and indicate a budget of 10 hours.

The management system 100 can compare the time restrictions on the provider is candidate 140 for the first project with the time budget and schedule for the newly proposed project. Any time or schedule conflict can be identified when the candidate provider 140 is presented via the display module 214 to the seeker 102. The management system 100 can also provide dates that the provider candidate 140 would next be available. For example, if the provider candidate 140 was booked on the first project for the next three days, the management system 100 could indicate the next availability of the candidate for the 10 hour project as starting on the fourth day and extending into the fifth day.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. A non-transitory computer readable medium containing instructions that, when executed by a computer system, cause the computer system to perform operations comprising:

Receiving, by the computer system, an electronic request for providers of a product or service;

Searching, by the computer system, an electronically stored profile in a resource management system for data identifying the providers, the electronically stored profile identifying contacts of the user;

Searching, by the computer system, for information regarding the providers by accessing, over the network, a plurality of external online social networks, wherein each of the external online social networks is accessed via a common application programming interface (API) framework;

Searching, by the computer system, for information regarding the providers through a plurality of internal referral networks having stored contact profiles electronically linked to the contacts, wherein the contact profiles are references via an array of pointers that point to locations in a database storing the contact profiles, wherein a first internal referral network from the plurality of internal referral networks is accessed via a first proprietary API framework, and wherein a second internal referral network from the plurality of internal referral networks is accessed via a second proprietary API framework;

Identifying, by the computer system, referral ratings stored in the resource management system for the contacts, wherein the referral ratings indicate a quality of referrals provided by the contacts;

Identifying the contacts having a network director status, the network director status being active or passive;

Ranking, by a ranking module of the computer system, the providers based on the referral ratings of the contacts;

Sending, by the computer system, the ranking over the network for displaying on the computer device; and Displaying the providers to the user based on the network director status of the contacts.

2. The computer readable medium of claim 1, wherein the instructions further comprise:

identifying, by the computer system, provider ratings stored in the resource management system and indicating quality levels for projects performed by the providers; and ranking, by the computer system, the providers based on the referral ratings and the provider ratings.

3. The computer readable medium of claim 2, wherein the instructions further comprise determining the referral ratings for the contacts based on the provider ratings for the providers in the internal referral networks of the contacts.

4. The computer readable medium of claim 1, wherein the instructions further comprise:

managing projects between the user and the providers through an online workspace;

rating the providers working on the projects via the online workspace;

ranking the providers and according the ratings; and determining the referral ratings for the contacts based on the ratings of the providers.

5. The computer readable medium of claim 1, wherein the instructions further comprise:

displaying some of the providers to the user as anonymous providers;

identifying the contacts associated with the anonymous providers to the user;

receiving a selection of one of the anonymous providers from the user;

providing a contract to the user; and enabling communication between the user and the selected one of the anonymous providers in response to execution of the contract.

6. The computer readable medium of claim 1, wherein the instructions further comprise ranking the providers based on a number of times the providers have been rated.

7. The computer readable medium of claim 1, wherein the instructions further comprise:

identifying specialties associated with the providers;

identifying the product or service contained in the request; and ranking the providers based on the specialties associated with the providers and the product or service contained in the request.

8. The computer readable medium of claim 1, wherein the instructions further comprise identifying to the user the providers identified through contacts of the user and identifying to the user the providers identified through the internal referral networks of the contacts.

9. A non-transitory computer readable medium containing instructions that, when executed by a computer system, cause the computer system to perform operations comprising:

Receiving, by the computer system, a request for providers of goods or services;

Searching, by the computer system, for the providers in a plurality of internal referral networks storing contacts, wherein a first internal referral network from the plurality of internal referral networks is accessed via a first proprietary application programming interface (API) framework, and wherein a second internal referral network from the plurality of internal referral networks is accessed via a second proprietary API framework;

Searching by the computer system, for the providers in a plurality of external online social networks, wherein each of the external online social networks is accessed via a common API framework;

Identifying, by the computer system, provider ratings of the providers, the provider ratings indicating quality levels for projects performed by the providers;

Identifying the contacts having a network director status, the network director status being active or passive;

Identifying, by the computer system, referral ratings for the contacts associated with the internal referral networks, the referral ratings indicating a quality of referrals provided by the contacts;

Ranking, by the computer system, the providers based on the provider ratings for the providers and the referral ratings for the contacts;

Displaying the providers to the user based on the network director status of the contacts.

10. The computer readable medium of claim 9, further comprising displaying, by the computer system, the providers according to referral agreements established between the providers and the contacts.

11. The computer readable medium of claim 9, further comprising selectively notifying, by the computer system, the contacts with the internal referral networks containing the providers.

12. The computer readable medium of claim 9, further comprising ranking, by the computer system, the providers based on an availability of the providers.

13. The computer-readable medium of claim 9, further comprising managing projects, by the computer system, between a user sending the request and one of the providers through an online workspace.

14. The computer-readable medium device of claim 9, further comprising ranking, by the computer system, the providers based on the providers being identified in the internal referral networks of the contacts or being identified in a personal network of a user sending the request.

15. The computer-readable medium device of claim 9, further comprise searching the internal referral networks based on profiles for the contacts.

* * * * *

UNITED STATES PATENT AND TRADEMARK OFFICE
CERTIFICATE OF CORRECTION

PATENT NO. : 10,339,584 B2  
APPLICATION NO. : 13/901928  
DATED : July 2, 2019  
INVENTOR(S) : Sean Crafts, Roger Neel and Raymond Grainger Page 1 of 1

It is certified that error appears in the above-identified patent and that said Letters Patent is hereby corrected as shown below:

On the Title Page

Item (73) Assignee, replace "MAENLINK, INC." with --MAVENLINK, INC.--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*